(No Model.) 2 Sheets—Sheet 2.

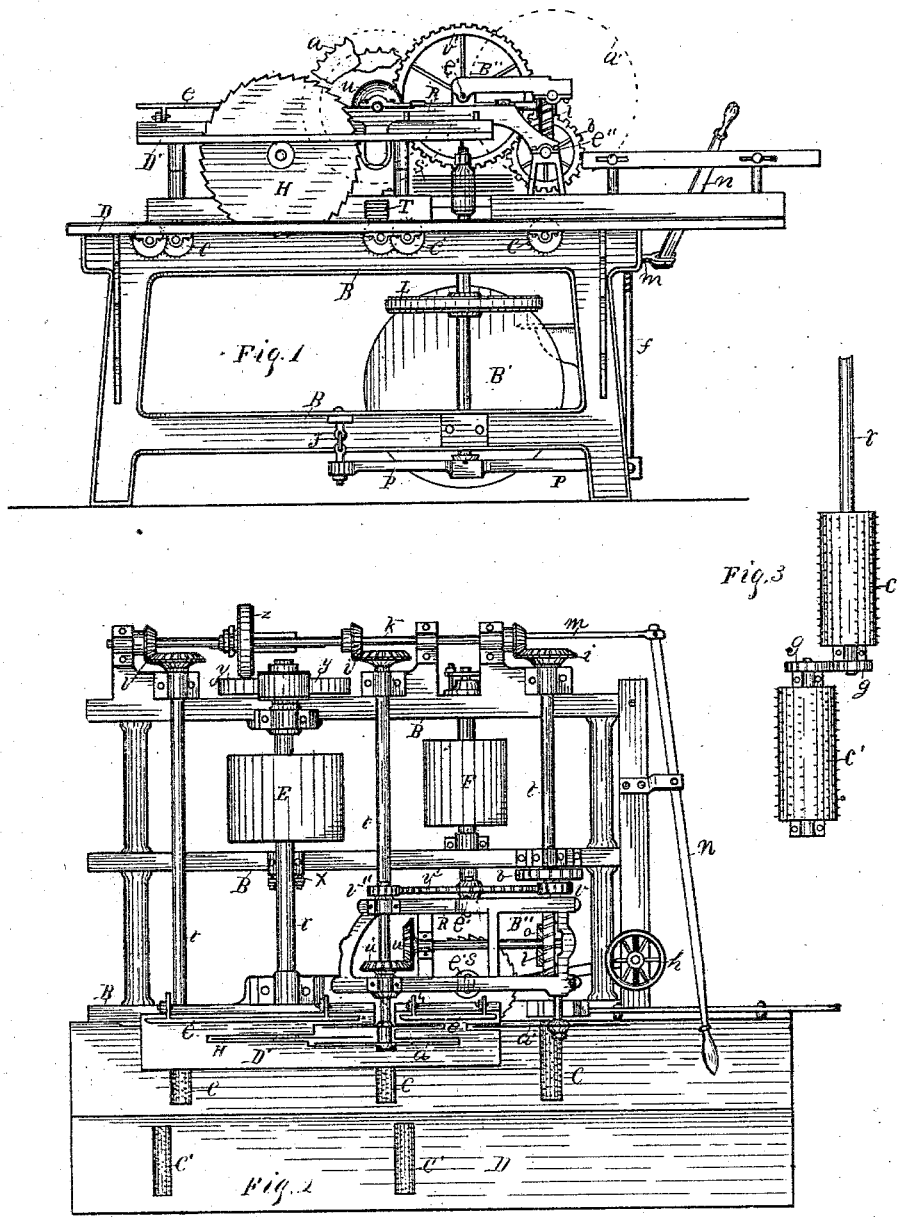

W. E. HILL.
LATH SAWING MACHINE.

No. 295,173. Patented Mar. 18, 1884.

Attest.
Jno. C. Perkins
Dumont A. Shepardson

Inventor.
William E. Hill
By Lucius C. West
Atty

UNITED STATES PATENT OFFICE.

WILLIAM E. HILL, OF KALAMAZOO, MICHIGAN.

LATH-SAWING MACHINE.

SPECIFICATION forming part of Letters Patent No. 295,173, dated March 18, 1884.

Application filed April 27, 1883. (No model.)

*To all whom it may concern:*

Be it known that I, WILLIAM E. HILL, a citizen of the United States, residing at Kalamazoo, county of Kalamazoo, State of Michigan, have invented a new and useful Lath-Machine, of which the following is a specification.

The object of my invention is to construct a lath-machine having horizontal and perpendicular saws adapted for sawing lath or lath and pickets from a block or slab at one and the same operation and in a perfected state.

Further objects are pointed out in the detailed description.

Figure 4:
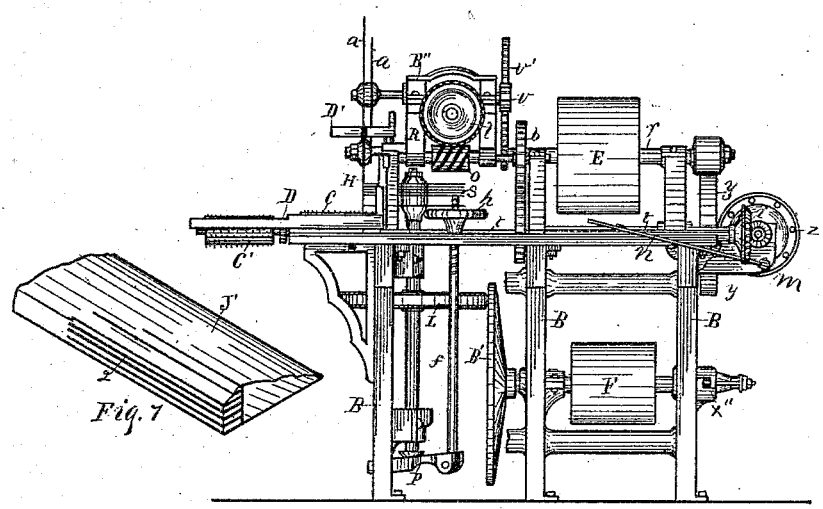
Figure 5:
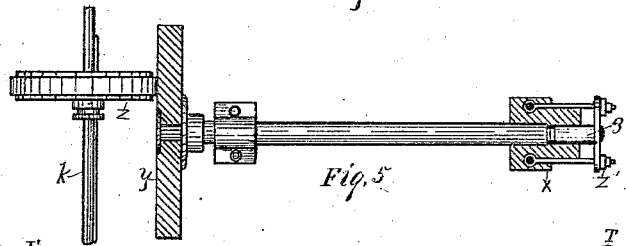
Figure 8:
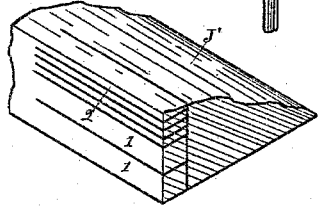
Figure 9:
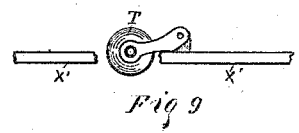
Figure 6:
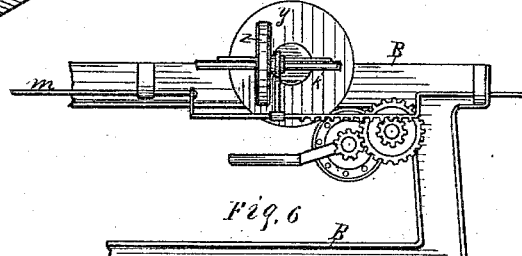

In the drawings, forming a part of this specification, Figure 1 is a front side elevation; Fig. 2, a top view; Fig. 3, a detached part, enlarged; Fig. 4, an end view, looking from a point at the right of Fig. 1; Fig. 5, a detached portion, partly in section, hereinafter described; Fig. 6, a rear elevation of a portion of the machine; Fig. 7, a slab, showing the plan of sawing lath; Fig. 8, the same, showing the plan of sawing lath and pickets; Fig. 9, a top view of a detached part of Fig. 1.

B B illustrate the frame, preferably iron, which supports the mechanism.

D is a table at the front top side of frame B. Slots are formed in the table, in which are located feed-rollers $c$ and carrier-rollers $c'$, having spurs covering their periphery surface. These rollers extend a little above the upper surface of table D. They are propelled by shafts $t\ t\ t$, and, being connected by gear $g\ g$, Fig. 3, they revolve in opposite directions—rollers $c$ toward the left, and rollers $c'$ the reverse direction. Thus the former are used to feed the slab or block through the saws H S, and the latter to carry it back, to be again run through.

$k$ is a horizontal shaft at the rear of the machine, having gear-wheels meshing with the bevel-gear $i\ i$ of the roller-shafts $t\ t$.

On shaft $k$ is located a laterally-adjustable friction-wheel, $z$, which engages the side of the friction-disk $y$. Motion is imparted to them from the shaft $r$ of the perpendicular saw H by a frictional engagement of said shaft with the periphery of disk $y$. A belt from the power mechanism connects with pulley E of shaft $r$. Disk $y$ is made with a depression in the axial center. In Fig. 5 said disk is shown in section, showing said depression. Moving friction-wheel $z$ opposite the depression of disk $y$ stops the motion of rollers $c\ c'$. By using such an arrangement of frictional gear, the machine makes less noise, and the feed-rollers may be stopped and started with great promptness and run at a higher rate of speed. The wheel $z$ is adjusted by means of a lever, $n$, at a convenient location to be handled. This lever is fulcrumed to the side of frame B, and is pivotally connected with rod $m$, which rod is connected with wheel $z$, as in Fig. 6.

At the right of Fig. 5 is shown a mode of cushioning the shaft of the friction-disk $y$, to prevent jarring, and to effect a close and constant engagement of wheel $z$ and disk $y$.

3 is a short plug or shaft connected with the binding-bar at one end, the other end resting against the end of the shaft in the bearings $x$, here shown in horizontal section. Rubbers $z'$ are located between the binding-bar and the nuts, forming a cushion, $a\ a$, and $a'$ are serrated feed-disks engaging the upper side of the block or slab, while feed-rollers $c$ engage the under side, as before explained. All unevenness of the slab is compensated for by the automatic rise and fall of the feed-disks. This is effected by locating the shafts of the feed-saws in frames B'' and R, and by hinging said frames at one end. Frame B'' is hinged to frame R at $e'\ e'$, and said frame R is hinged on the shaft of gear-wheel $b$ at $e''\ e''$. The frames thus hinged may be raised up when not desiring to use the feed-disks. Motion is imparted to the feed-disks by an engagement of gear $b$ with a gear beneath it on the right-hand shaft $t$. The shaft connecting with gear $b$ is provided with worm-gear $o$, which meshes with gear $l$ of a shaft located across frame R. Bevel-gear $u\ u'$ connects said shafts with the shaft of the feed-disks $a\ a$. Gear $v''$ of said shaft connects with gear $v'$, and gear $v'$ connects with gear $v$ of the shaft of the feed-saw $a'$.

The object of connecting the shafts of the feed-disks with the propelling-shaft by means of a worm-gear, $o$, is to prevent all slacking back of the feed-disks when meeting obstructions. Saw H is located between the feed-disks $a\ a$, Fig. 2. The rear one of the feed-saws $a\ a$ is made smaller than the other, in order that it may not unduly bear down on the sawed lath and cause the saws to bind. One use of the rear feed-disk *a* is to engage a strip of slab which has become too narrow to be acted upon by the other saw *a*.

S are the horizontal lath-saws, which cut into the timber the width of the lath, while the perpendicular saw H severs the lath from the slab, Fig. 7. The shaft to which the saws S are secured is vertically adjustable by means of hand-screw *h* of bar *f*, said bar being pivotally connected with support P, upon which the lower end of the saw-shaft rests. Support P is jointedly connected with frame B at J.

In Figs. 1 and 4 a horizontal saw is shown half-way between the cluster S and the table D. By this means a portion of the slab J' is sawed into pickets 1 1. At the same time a portion is sawed into lath 2. When no portion of the slab is available for pickets, the saws are lowered by means of screw *h*, bringing the picket-saw below the top of the table D. Motion is imparted to saws S by the engagement of friction-wheel L of the saw-shaft and disk B'. The end of the shaft of disk B' is cushioned at *x''*, the same as at *x* in Fig. 5, and for the same object. The belt which connects pulley E may also surround pulley F; or a separate belt may be used.

T are revoluble disks, which may be used in position shown in Fig. 1, to enter the trail of saws S and hold up the lath from binding the saws.

In Fig. 6 a change in the manner of stopping and starting the rollers *c c'* is shown, but upon which I base no description.

D' is an edging-table, located above table D, Fig. 1. It is provided with slots, in which the lath-saw H and the feed-disks *a a* are located, Fig. 2. This table serves as a guard to the saws, and may be used for edging the slabs or for slitting up timber by first raising up the feed-disks *a a* out of the way, which may be readily done, as before explained, owing to their frames being hinged.

*e e* is an adjustable gage to control the width of the edging to be sawed.

In the operation the operator can readily control the machine and attend to the slab, as the lever *n* and hand-screw *h* are in a position to be easily reached. After the slab has passed from him through the saws over rollers *c c*, an attendant at the other end places it on carrier-rollers *c' c'*, which carry it back, as before explained.

Having thus described my invention, what I claim is—

1. In a lath-sawing machine, the perpendicular saw and the horizontal saws, in combination with the feed-rollers, the carrier-rollers, and the perpendicular serrated feed-disks, all arranged and adapted to operate substantially as described.

2. In a lath-sawing machine, the combination, with the perpendicular lath-saw, the horizontal lath-saws secured to a vertically-adjustable shaft, and the hinged support to said shaft, of the serrated feed-disks and the feed and carrier rollers, all substantially as set forth.

3. The combination, with the perpendicular saw, the horizontal lath-saws supported by a vertical shaft, and the hinged support to said shaft, of the feed and carrier rollers and the automatically-yielding feed-disks, substantially as shown.

4. In a lath-machine, the combination, with the perpendicular and horizontal lath-saws, of the feed-disks and the feed-rollers, the latter provided with gear at the rear ends, the shaft having the bevel-gear meshing with the gear of said feed-roller shafts, the laterally-adjustable friction-wheel, the disk having the center depression connected with a power-shaft, and the bar and pivoted lever adapted for operating said friction-wheel, all located and adapted substantially as set forth.

5. The perpendicular lath-saw, feed-disks, and feed-rollers, in combination with a series of horizontal lath-saws mounted upon a vertical shaft which is vertically adjustable, a hinged support to the lower end of said shaft, and means for operating said hinged support, substantially as described.

6. The perpendicular lath-saw, means shown for feeding the slab, the series of horizontal lath and picket saws secured to a vertically-adjustable shaft, said shaft provided with the horizontal friction-wheel, the power-shaft having the friction-disk adapted to engage said friction-wheel, and means for adjusting said vertical saw-shaft, substantially as set forth.

In testimony of the foregoing I have hereunto subscribed my name in the presence of two witnesses.

WILLIAM E. HILL.

Witnesses:
 DUMONT A. SHEPARDSON,
 HORACE DENISON.